(12) United States Patent
Coy

(10) Patent No.: US 7,963,545 B2
(45) Date of Patent: Jun. 21, 2011

(54) INTERCHANGEABLE HITCH BALL

(76) Inventor: Thomas Coy, Glendale, CA (US)

( * ) Notice: Subject to any disclaimer, the term of this patent is extended or adjusted under 35 U.S.C. 154(b) by 54 days.

(21) Appl. No.: 12/479,025

(22) Filed: Jun. 5, 2009

(65) Prior Publication Data

US 2010/0308560 A1    Dec. 9, 2010

(51) Int. Cl.
*B60D 1/06* (2006.01)
(52) U.S. Cl. .................................. 280/511; 280/491.5
(58) Field of Classification Search ................ 280/511, 280/491.5, 416.1
See application file for complete search history.

(56) References Cited

U.S. PATENT DOCUMENTS

| | | | |
|---|---|---|---|
| 2,297,182 A | 9/1942 | Weiss | |
| 4,230,336 A | 10/1980 | Avrea et al. | |
| 4,433,854 A | 2/1984 | Smith | |
| 4,522,421 A | 6/1985 | Vance | |
| 4,596,406 A | 6/1986 | Van Vleet et al. | |
| 4,889,356 A | 12/1989 | Morris | |
| 4,938,496 A | 7/1990 | Thomas et al. | |
| 5,040,817 A | 8/1991 | Dunn | |
| 5,085,452 A | 2/1992 | Janiero | |
| 5,116,072 A * | 5/1992 | Swenson | 280/511 |
| 5,280,941 A | 1/1994 | Guhlin | |
| 5,395,131 A | 3/1995 | Herrick | |
| 5,419,576 A | 5/1995 | Van Vleet | |
| 5,741,022 A | 4/1998 | Wass et al. | |
| 5,871,222 A | 2/1999 | Webb | |
| 6,053,521 A | 4/2000 | Schertler | |
| 6,113,303 A | 9/2000 | Buhl et al. | |
| 6,173,985 B1 | 1/2001 | Thomas | |
| 6,241,271 B1 | 6/2001 | Belinky | |
| 6,616,168 B2 | 9/2003 | Belinky | |
| 6,715,781 B1 * | 4/2004 | Smith | 280/416.1 |
| 6,783,144 B2 | 8/2004 | McCoy et al. | |
| 6,983,950 B2 | 1/2006 | McCoy et al. | |
| 2001/0045725 A1 | 11/2001 | McCoy et al. | |

FOREIGN PATENT DOCUMENTS

EP    0371750 A1    6/1990
GB    2221249 A    1/1990

* cited by examiner

*Primary Examiner* — Kevin Hurley
(74) *Attorney, Agent, or Firm* — Tsircou Law, P.C.

(57) ABSTRACT

An interchangeable hitch ball assembly is provided having hitch post, a removable hitch ball, and a connector pin. The hitch post defines an annular groove proximate to the top end that is sized to receive spaced-apart prongs of the connector pin along opposing sides of the hitch post. Removable hitch ball defines a pin recess aligned with the annular groove of the hitch post. The user can remove the hitch ball by extracting the connector pin. In this manner, the user can utilize hitch balls of different sizes, as needed.

16 Claims, 2 Drawing Sheets

INTERCHANGEABLE HITCH BALL

FIELD OF THE INVENTION

The present invention relates generally to a hitch ball assembly and, more particularly, a hitch ball assembly having interchangeable balls of different sizes.

BACKGROUND OF THE INVENTION

Hitch assemblies have long been used to provide a mechanism for attaching a trailer to a tow vehicle. Typically, a tow vehicle includes a hitch ball at the rear of the vehicle and the trailer includes a coupling device that attaches atop the hitch ball. More particularly, the tow ball typically is secured to a hitch bar, or draw bar, that extends rearward from the rear of the vehicle. Such hitch bars include a shank that extends axially into a hitch receiver of the tow vehicle.

The trailer typically includes a tongue assembly that defines a socket for securing to the hitch ball of the tow vehicle. Notably, tongue assemblies are typically configured to mount with a hitch ball of a prescribed size, and the required hitch ball size can vary between tongue assemblies of different trailers. Thus, a user must ensure that the tow vehicle is equipped with a hitch ball of the proper size for the trailer to be towed. Using an improper hitch ball can be a serious safety concern, as well as risking damage to the tow vehicle and the trailer.

Conventional hitch balls include a spherical body integrally formed with a post having a threaded portion for mounting to the tow vehicle. Thus, changing out a conventional hitch ball requires particular tools and considerable effort. More recently, efforts have been made to provide hitch ball assemblies having interchangeable hitch balls. However, current approaches often rely on complex internal components to secure the hitch ball to the hitch post. Thus, wear or damage to such components can go unnoticed, creating an increased risk of failure of the hitch ball assembly.

It should, therefore, be appreciated that there remains a need for a hitch ball assembly that addresses the aforementioned shortcomings. The present invention fulfills this need and others.

SUMMARY OF THE INVENTION

In general terms, the present invention provides a hitch ball assembly that includes a hitch post, a removable hitch ball, and a connector pin. The hitch post defines an annular groove proximate to the top end that is sized to receive spaced-apart prongs of the connector pin along opposing sides of the hitch post. Removable hitch ball defines a pin recess aligned with the annular groove of the hitch post. The user can remove the hitch ball by extracting the connector pin. In this manner, the user can utilize hitch balls of different sizes, as needed.

In a detailed aspect of an exemplary embodiment, the pin recess is sized such that the connector pin does not extend past an outer surface of the hitch ball, once fully inserted into the pin recess, and the hitch ball further defines an extraction groove extending from the pin recess aligned with a cross member of the connector pin when in place.

More particularly, and in an exemplary embodiment, the hitch ball includes a stop within the pin recess configured to interact with a cross member of the connector pin to control the depth of insertion of the connector pin. The pin recess can define two proximal holes aligned with the annular recess of the hitch post such that the two prongs of the connector pin extend through the two holes. The hitch ball can further define two distal holes aligned to receive distal ends of the two prongs of the connector pins.

In another detailed aspect of an exemplary embodiment, the hitch post includes an upper section having a frusto-conical configuration and the bore of the hitch ball has a frusto-conical configuration that substantially conforms to the upper section.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein. Moreover, a number of features are discussed throughout the specification with reference to particular embodiments. Nonetheless, those skilled in the art will appreciate that various other embodiments can be provided without departing from the scope of the invention, to include any and all combination of features discussed.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which.

DETAILED DESCRIPTION OF THE PREFERRED EMBODIMENTS

Figure 1:
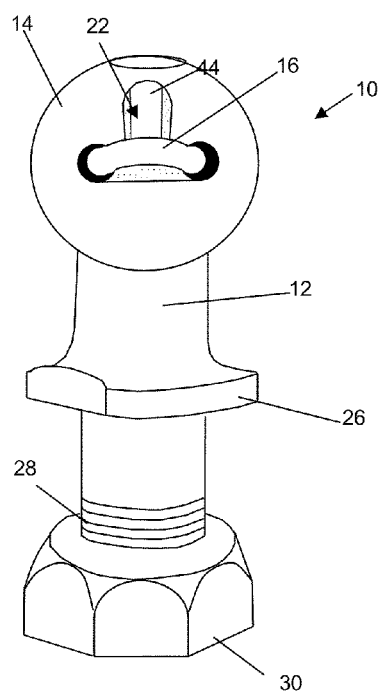
FIG. 1 is a partially exploded perspective view of a hitch ball assembly in accordance with the invention.
Figure 2:
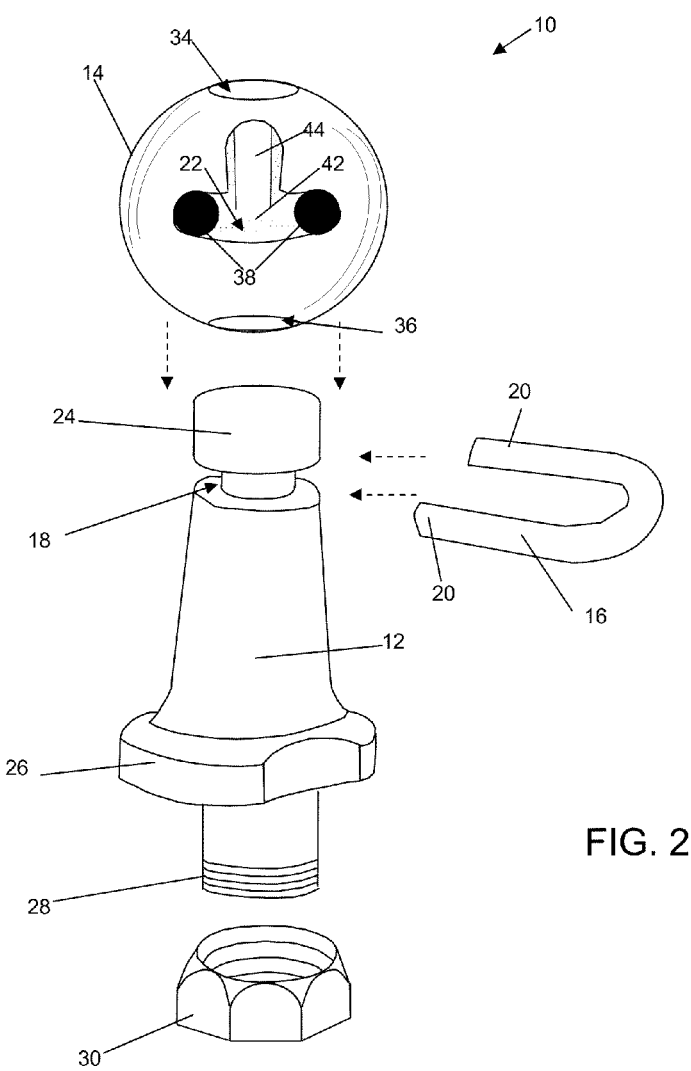
FIG. 2. is a perspective view of the hitch ball assembly of FIG. 1.
Figure 3:
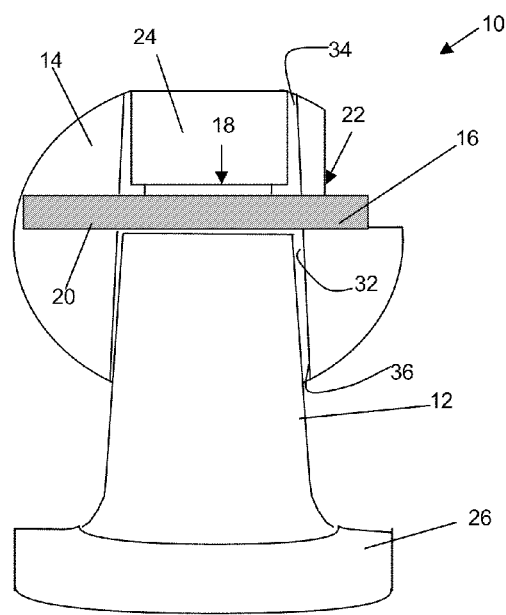
FIG. 3 is a cross sectional view of the hitch ball assembly taken along line 3-3 of FIG. 1.
Figure 3:
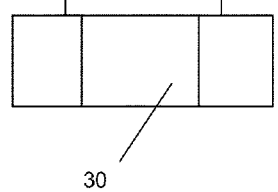
Figure 4:
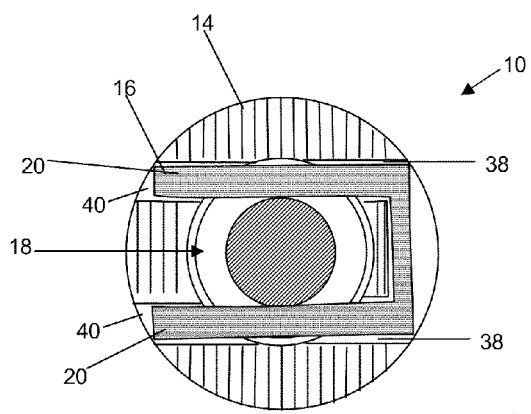
FIG. 4 is a cross sectional view of the hitch ball assembly taken along line 4-4 of FIG. 1.

Referring now to the drawings, and particularly FIG. 1, there is shown a hitch ball assembly 10 that includes a hitch post 12, a removable hitch ball 14 and a connector pin 16. The hitch post defines an annular groove 18 proximate to the top end that is sized to receive spaced-apart prongs 20 of the connector pin along opposing sides of the hitch post. Removable hitch ball 14 defines a pin recess 22 aligned with the annular groove of the hitch post. The pin recess is sized such that the connector pin does not extend past an outer surface of the hitch ball, once fully inserted into the pin recess. The user can remove the hitch ball by extracting the connector pin. In this manner, the user can utilize hitch balls of different sizes, as needed.

The hitch post 12 includes a generally frusto-conical upper section 24, an intermediate flange section 26 having a greater diameter than the upper section, and a lower threaded section 28. The hitch ball assembly 10 further includes a nut 30 configured to mate with the treaded section.

The hitch ball 14 defines an axial bore 32 having a top opening 34 and a bottom opening 36. The bore sized to enable insertion of the hitch ball on to the hitch post 12. The hitch ball further defines two spaced-apart proximal holes 38 from the pin recess 22 aligned with the annular groove 18 and two spaced-apart distal holes 40 aligned with the annular groove 18 an opposing side of the hitch ball relative to the proximal holes. The holes (38, 40) are configured to receive the prongs 20 of the connector pin 16, to secure the hitch ball to the hitch post in a rotatable manner. Even when in use, the hitch ball can rotate about the longitudinal axis of the hitch post.

The pin recess 22 is sized such that the connector pin 16 does not extend past an outer surface of the hitch ball, once fully inserted into the pin recess. The connector pin 16 includes a cross member 42 disposed between the two prongs 20. The hitch ball includes a stop within the pin recess configured to interact with the cross member of the connector pin to control the depth of insertion of the connector pin.

The connector pin 16 is sized to be inserted into the pin recess 22 of the hitch ball such that the two prongs extend though the two proximal holes 28 into the annular groove on opposing sides of the hitch post, distal ends 40 of the two prongs being received within the two distal holes.

In the exemplary embodiment, the bore 32 has a frusto-conical shape that generally conforms to that of the upper section of the hitch post. In this manner, the upper section 24 and the bore of the hitch ball are cooperatively configured such that annular groove 18 and the pin recess 22 align with one another without effort. In the exemplary embodiment, the upper section 24 of the hitch post 12 has a diameter ($D_1$) located at a prescribed distance from the top end. The diameter ($D_1$) is greater than the diameter ($D_b$) of the bottom opening 36 to the bore 32 of the hitch ball 14. Thus, the hitch ball cannot be misaligned with annular groove of the hitch post.

The hitch ball 14 further defines an extraction groove 44 upward extending from the pin recess aligned with the cross member of the connector pin and with the stop of the hitch ball. The extraction groove enables the user to remove the connector pin easily. For example, the user can use a conventional hand tool, such as a screwdriver, to remove the pin. To do so, the user simply aligns the end of the tool with the cross member 42 of the connector pin within the extraction groove and applies sufficient force to cause the connector pin to be withdrawn from the hitch ball. With the connector pin remove, the user can pull the hitch ball off the hitch post with relative ease.

The hitch ball assembly 10 can include multiple hitch balls having utilize hitch balls of different sizes, (e.g., diameters of 2 inches, 2½ inches, and so on), so that the user can select a hitch ball of an appropriate size for a prescribed task. In addition, hitch balls of various sizes useable with the assembly can be sold separately.

It should be appreciated from the foregoing that the present invention provides a hitch ball assembly having a hitch post, a removable hitch ball, and a connector pin. The hitch post defines an annular groove proximate to the top end that is sized to receive spaced-apart prongs of the connector pin along opposing sides of the hitch post. Removable hitch ball defines a pin recess aligned with the annular groove of the hitch post. The user can remove the hitch ball by extracting the connector pin. In this manner, the user can utilize hitch balls of different sizes, as needed.

Although the invention has been disclosed in detail with reference only to the exemplary embodiments, those skilled in the art will appreciate that various other embodiments can be provided without departing from the scope of the invention, to include any and all combination of features discussed herein. Accordingly, the invention is defined only by the claims set forth below.

What is claimed is:

1. A hitch ball assembly, comprising:
    a hitch post having a top end, a bottom end, and a longitudinal axis, the hitch post defining an annular groove proximate to the top end generally perpendicular to the longitudinal axis;
    a removable hitch ball defining an axial bore having a bottom opening, the bore sized to enable insertion of the hitch ball on to the hitch post, the hitch ball further defining a pin recess aligned with the annular groove of the hitch post when the hitch ball is seated on the hitch post; and
    a connector pin having two prongs spaced apart from each other, the connector pin sized to be inserted into the pin recess of the hitch ball such that the two prongs extend though the annular groove on opposing sides of the hitch post;
    wherein the hitch ball includes a stop within the pin recess configured to interact with a cross member of the connector pin to control the depth of insertion of the connector pin.

2. A hitch ball assembly as defined in claim 1, wherein the hitch post includes an upper section having a frusto-conical configuration and the bore of the hitch ball has a frusto-conical configuration that substantially conforms to the upper section.

3. A hitch ball assembly as defined in claim 1, wherein the pin recess defines two proximal holes aligned with the annular recess of the hitch post such that the two prongs of the connector pin extend through the two holes.

4. A hitch ball assembly as defined in claim 1, wherein the pin recess is sized such that the connector pin does not extend past an outer surface of the hitch ball, once fully inserted into the pin recess.

5. A hitch ball assembly as defined in claim 1, wherein the hitch ball further defines an extraction groove extending from the pin recess aligned with a cross member of the connector pin when in place.

6. A hitch ball assembly as defined in claim 1, wherein the hitch ball further defines two distal holes aligned to receive distal ends of the two prongs of the connector pins.

7. A hitch ball assembly, comprising:
    a hitch post having a top end, a bottom end, and a longitudinal axis, the hitch post including a generally frusto-conical upper section and an flange section disposed below and having a greater diameter than the upper section, the upper section defining an annular groove proximate to the top end generally perpendicular to the longitudinal axis;
    a removable hitch ball defining an axial bore having a top opening and a bottom opening, the bore sized to enable insertion of the hitch ball on to the hitch post, the hitch ball further defining a pin recess aligned with the annular groove of the hitch post when the hitch ball is seated on the hitch post; and
    a connector pin having two prongs spaced apart from each other, the connector pin sized to be inserted into the pin recess of the hitch ball such that the two prongs extend though the annular groove on opposing sides of the hitch post.

8. A hitch ball assembly as defined in claim 7, wherein the pin recess is sized such that the connector pin does not extend past an outer surface of the hitch ball, once fully inserted into the pin recess.

9. A hitch ball assembly as defined in claim 7, wherein the hitch ball further defines an extraction groove extending upward from the pin recess aligned with a cross member of the connector pin when in place.

10. A hitch ball assembly as defined in claim 7, wherein the hitch ball further defines two distal holes aligned to receive distal ends of the two prongs of the connector pins.

11. A hitch ball assembly as defined in claim 7, wherein the pin recess defines two proximal holes aligned with the annular recess of the hitch post such that the two prongs of the connector pin extend through the two holes.

12. A hitch ball assembly as defined in claim 7, wherein a lower portion of the frusto-conical upper section of the hitch post has a diameter greater than a diameter of the bottom opening of the hitch ball.

13. A hitch ball assembly, comprising:

a hitch post having a top end, a bottom end, and a longitudinal axis, the hitch post including a generally frusto-conical upper section, an intermediate flange section having a greater diameter than the upper portion, and a lower cylindrical treaded section, the upper section defining an annular groove proximate to the top end generally perpendicular to the longitudinal axis;

a removable hitch ball defining an axial bore having a top opening and a bottom opening, the bore sized to enable insertion of the hitch ball on to the hitch post, the hitch ball further defining a pin recess aligned with the annular groove of the hitch post when the hitch ball is seated on the hitch post, the hitch ball defining two spaced-apart proximal holes from the pin recess aligned with the annular groove and two spaced-apart distal holes aligned with the annular groove an opposing side of the hitch ball relative to the proximal holes; and a connector pin having two prongs spaced apart from each other and a cross member disposed therebetween, the connector pin sized to be inserted into the pin recess of the hitch ball such that the two prongs extend though the two proximal holes into the annular groove on opposing sides of the hitch post, distal ends of the two prongs being received within the two distal holes.

14. A hitch ball assembly as defined in claim 13, wherein a lower portion of the frusto-conical upper section of the hitch post has a diameter greater than a diameter of the bottom opening of the hitch ball.

15. A hitch ball assembly as defined in claim 13, wherein the hitch ball includes a stop within the pin recess configured to interact with the cross member of the connector pin to control the depth of insertion of the connector pin.

16. A hitch ball assembly as defined in claim 15, wherein the hitch ball further defines an extraction groove upward extending from the pin recess aligned with the cross member of the connector pin and with the stop of the hitch ball.

* * * * *